US011666960B2

(12) United States Patent
Schmid et al.

(10) Patent No.: US 11,666,960 B2
(45) Date of Patent: Jun. 6, 2023

(54) WORKPIECE ACCUMULATOR FOR A STAMPING MACHINE

(71) Applicant: GM GLOBAL TECHNOLOGY OPERATIONS LLC, Detroit, MI (US)

(72) Inventors: Kenneth D. Schmid, Novi, MI (US); Paul C. Oberski, Roseville, MI (US)

(73) Assignee: GM Global Technology Operations LLC, Detroit, MI (US)

( * ) Notice: Subject to any disclaimer, the term of this patent is extended or adjusted under 35 U.S.C. 154(b) by 605 days.

(21) Appl. No.: 16/856,229

(22) Filed: Apr. 23, 2020

(65) Prior Publication Data

US 2021/0331229 A1 Oct. 28, 2021

(51) Int. Cl.
*B65G 57/03* (2006.01)
*B21D 43/20* (2006.01)
*B23Q 1/54* (2006.01)
*B21D 43/02* (2006.01)

(52) U.S. Cl.
CPC ........... *B21D 43/20* (2013.01); *B21D 43/022* (2013.01); *B23Q 1/5462* (2013.01)

(58) Field of Classification Search
CPC ...... B21D 43/20; B65G 57/035; B65G 57/03; B65G 57/06; B65G 57/245; B65G 57/00; B65G 57/165; B65G 57/14
USPC ............... 414/792.7, 793.8, 790.1; 83/89, 90
See application file for complete search history.

(56) References Cited

U.S. PATENT DOCUMENTS

| 3,533,517 | A | * | 10/1970 | Heide | B65G 37/00 414/790 |
| 4,043,459 | A | * | 8/1977 | Moreau | B65G 57/03 83/167 |
| 4,132,320 | A | * | 1/1979 | Cournoyer | B65G 57/165 414/794 |
| 5,062,762 | A | * | 11/1991 | Wirtz | B21D 43/20 414/794.3 |
| 6,006,638 | A | * | 12/1999 | Eltringham | B21D 43/20 83/402 |
| 6,769,862 | B1 | * | 8/2004 | Kuhl | B65G 57/06 414/789.9 |
| 10,843,252 | B2 | * | 11/2020 | Woidasky | B21D 43/20 |
| 2011/0150620 | A1 | * | 6/2011 | Littlejohn | B65G 57/165 414/790.7 |
| 2011/0283915 | A1 | * | 11/2011 | Kumar | B61F 5/30 701/19 |
| 2013/0257373 | A1 | * | 10/2013 | Mallon, IV | F16L 3/16 248/65 |

* cited by examiner

*Primary Examiner* — Lynn E Schwenning
(74) *Attorney, Agent, or Firm* — Quinn IP Law

(57) ABSTRACT

A workpiece accumulator system for a stamping machine includes linear actuators, nesting blocks, exit rails, and a first controller. The nesting blocks are disposed on moveable members of the linear actuators and arranged to vertically stack workpieces being fabricated by the stamping machine. The first controller communicates with a second controller that controls the stamping machine. The first controller controls the linear positions of the linear actuators to retract the nesting blocks from an initial position to accommodate placement of the one of the plurality of workpieces in a stack on the nesting blocks. The linear actuators are controlled to retract the nesting blocks to fully retracted positions to place the plurality of workpieces in the stack onto the exit rails when a quantity of the plurality of workpieces in the stack is equal to a desired quantity.

20 Claims, 2 Drawing Sheets

WORKPIECE ACCUMULATOR FOR A STAMPING MACHINE

INTRODUCTION

Repetitive fabrication of workpieces such as stamping operations, and progressive die stamping operations, are employed to produce workpieces for industries such as automotive, electronics, appliances, etc. Progressive die stamping presses include multiple workstations arranged in series, each which performs one or more operations on a workpiece. Raw material can be fed to the stamping press as a stock strip from a coil, with one or multiple operations being executed thereon. A finished workpiece is cut out of the stock strip in a final operation of the stamping press and fed to a workpiece accumulator or a bin.

A workpiece accumulator may jam, or otherwise become non-functional because a finished workpiece becomes misaligned or is otherwise misfed. This action may result in stoppage of the stamping press, with associated loss in productivity and throughput.

SUMMARY

A workpiece accumulator system for a stamping machine is described, and includes one or a plurality of linear actuators and one or a plurality of nesting blocks, a plurality of exit rails, and a first controller. Each of the linear actuators includes a static portion and a moveable member, and the nesting blocks are disposed on the moveable member(s) of the linear actuator(s). The nesting blocks are arranged to vertically stack a plurality of workpieces being fabricated by the stamping machine. The first controller is operatively connected to the linear actuator(s) to control linear position(s) of the moveable member(s) of the linear actuator(s), and is configured to communicate with a second controller that controls the stamping machine. The first controller is operable to determine a cycle advancement of the stamping machine based upon an input signal from the second controller, wherein the cycle advancement is associated with fabrication of one of the plurality of workpieces, and control the linear position(s) of the moveable member(s) of the linear actuator(s) to retract the nesting blocks from an initial position to accommodate placement of the one of the plurality of workpieces in a stack on the nesting blocks. The linear position(s) of the moveable member(s) of the linear actuator(s) are controlled to retract the nesting blocks to fully retracted positions to place the plurality of workpieces in the stack onto the exit rails when a quantity of the plurality of workpieces in the stack is equal to a desired quantity.

An aspect of the disclosure includes the first controller being operable to control the moveable member of the linear actuator to reset the nesting blocks to the initial positions subsequent to placing the plurality of workpieces disposed in the stack onto the plurality of exit rails.

Another aspect of the disclosure includes the linear actuator being a programmable pneumatically-actuated device including the moveable member and a position feedback device.

Another aspect of the disclosure includes the linear actuator being a programmable magnetically-actuated device including the moveable member and a position feedback device.

Another aspect of the disclosure includes the linear actuator being a programmable electrically-actuated device including the moveable member and a position feedback device.

Another aspect of the disclosure includes the linear actuator being a programmable mechanical screw-actuated device including the moveable member and a position feedback device.

Another aspect of the disclosure includes the controller being operative to retract the moveable member of the linear actuator by a magnitude equivalent to a cross-section of one of the plurality of workpieces.

The above summary is not intended to represent every possible embodiment or every aspect of the present disclosure. Rather, the foregoing summary is intended to exemplify some of the novel aspects and features disclosed herein. The above features and advantages, and other features and advantages of the present disclosure, will be readily apparent from the following detailed description of representative embodiments and modes for carrying out the present disclosure when taken in connection with the accompanying drawings and the claims.

BRIEF DESCRIPTION OF THE DRAWINGS

One or more embodiments will now be described, by way of example, with reference to the accompanying drawings, in which.

The appended drawings are not necessarily to scale, and may present a somewhat simplified representation of various preferred features of the present disclosure as disclosed herein, including, for example, specific dimensions, orientations, locations, and shapes. Details associated with such features will be determined in workpiece by the particular intended application and use environment.

DETAILED DESCRIPTION

The components of the disclosed embodiments, as described and illustrated herein, may be arranged and designed in a variety of different configurations. Thus, the following detailed description is not intended to limit the scope of the disclosure, as claimed, but is merely representative of possible embodiments thereof. In addition, while numerous specific details are set forth in the following description in order to provide a thorough understanding of the embodiments disclosed herein, some embodiments can be practiced without some of these details. Moreover, for the purpose of clarity, certain technical material that is understood in the related art has not been described in detail in order to avoid unnecessarily obscuring the disclosure. Furthermore, the drawings are in simplified form and are not to precise scale. For purposes of convenience and clarity, directional terms such as top, bottom, left, right, up, over, above, below, beneath, rear, and front, may be used with respect to the drawings. These and similar directional terms are not to be construed to limit the scope of the disclosure. Furthermore, the disclosure, as illustrated and described herein, may be practiced in the absence of an element that is not specifically disclosed herein.

Figure 1:
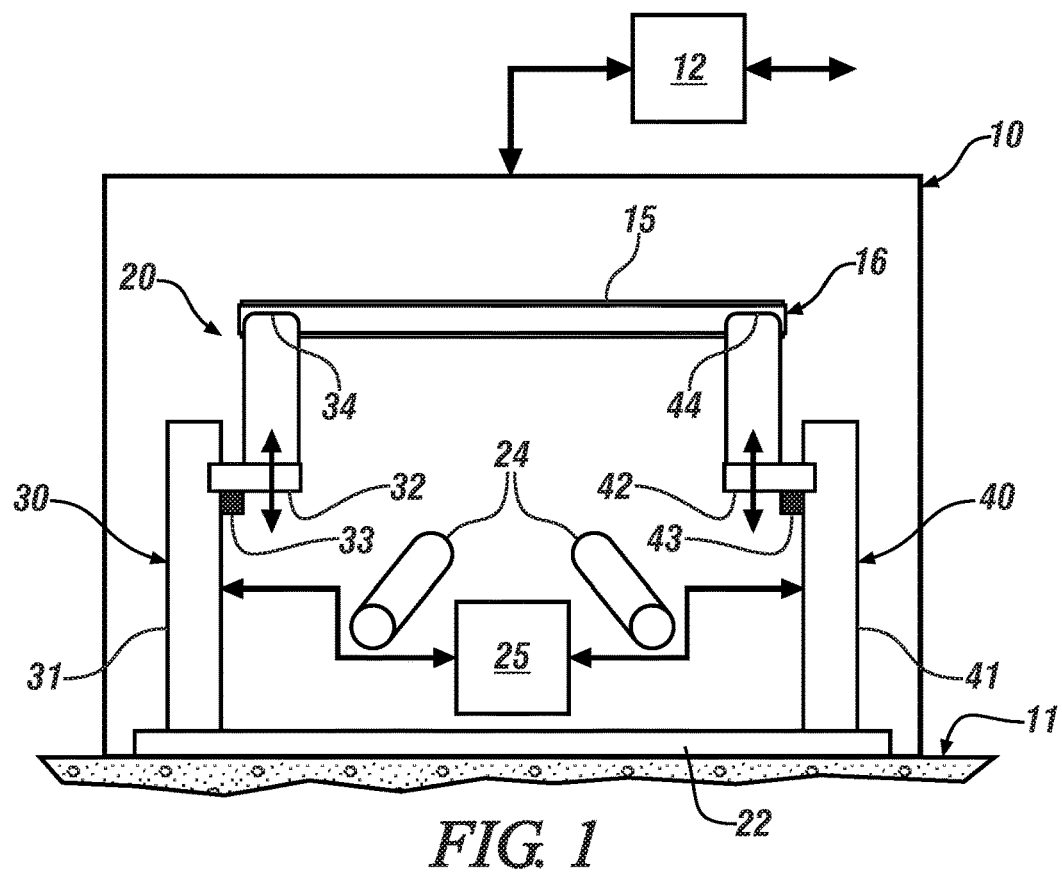
FIG. 1 schematically shows an end view of one embodiment of a workpiece accumulator system for a stamping machine, in accordance with the disclosure.

Referring to the drawings, wherein like reference numerals correspond to like or similar components throughout the several Figures, FIG. 1, consistent with embodiments disclosed herein, illustrates an embodiment of a workpiece accumulator system 20 for a stamping machine 10. The stamping machine 10 is disposed on a floor 11. In one embodiment the stamping machine 10 is a progressive die stamping machine 10, with the workpiece accumulator system 20 being disposed at an end thereof. The workpiece accumulator system 20 is disposed on a base 22, and is positioned and arranged to accumulate and stack each of a plurality of workpieces 15 that have been fabricated by the progressive die stamping machine 10. A single workpiece 15 disposed on the workpiece accumulator system 20 is illustrated.

The workpiece accumulator system 20 includes, in one embodiment, first and second linear actuators 30, 40, respectively, first and second nesting blocks 34, 44, respectively, a plurality of exit rails 24, and a first controller 25. Each of the linear actuators includes a static portion and a moveable member. The first and second linear actuators 30, 40 are arranged with longitudinal axes that are vertically-oriented relative to the floor 11. As shown in this embodiment, the first linear actuator 30 includes a first static portion 31, a first moveable member 32, and a first position feedback sensor 33. The first nesting block 34 is disposed on the first moveable member 32, and both are arranged to move vertically upward or downward in a stepwise manner in response to a control signal from the first controller 25. The second linear actuator 40 includes a second static portion 41, a second moveable member 42, and a second position feedback sensor 43. The second nesting block 44 is disposed on the second moveable member 42, and both are arranged to move vertically. The first and second nesting blocks 34, 44 are arranged to vertically stack a plurality of the workpieces 15 that have been fabricated by the progressive die stamping machine 10. The first and second nesting blocks 34, 44 are positioned in their initial positions as shown in FIG. 1.

The first and second linear actuators 30, 40 are configured as programmable cylinders that can provide precision vertical position control of the first and second nesting blocks 34, 44 employing information from the respective first and second position feedback sensors 33, 43. The first and second linear actuators 30, 40 are capable of linear travel in stepwise increments that are less than 1 mm in response to control commands from the first controller 25. As such, the first and second linear actuators 30, 40 can incrementally vertically move the first and second nesting blocks 34, 44 downward by a magnitude that may be based upon a cross-section of the workpiece 15, which may be between 1 mm and 10 mm in one embodiment. Thus, the first controller 25 controls the linear positions of the first and second moveable members 32, 42 of the first and second linear actuators 30, 40 to incrementally adjust the linear positions of the first and second nesting blocks 34, 44 to accommodate placement of the one of the plurality of workpieces 15 in a stack 16. This operation may be executed when it is determined, based upon an input signal from the press controller 12, that the stamping machine 10 has executed a cycle advancement that is associated with fabrication of one of the plurality of workpieces 15. The first controller 25 controls the linear positions of the first and second moveable members 32, 42 of the first and second linear actuators 30, 40 to adjust the linear positions of the respective first and second nesting blocks 34, 44 to accommodate placement of the one of the plurality of workpieces 15 in the stack 16 on the first and second nesting blocks 34, 44.

When the quantity of the plurality of workpieces 15 arranged in the stack 16 that is disposed on the first and second nesting blocks 34, 44 is equal to a desired quantity, the first controller 25 controls the linear positions of the first and second moveable members 32, 42 of the first and second linear actuators 30, 40 to retract the first and second nesting blocks 34, 44 to fully retracted positions to place the plurality of workpieces 15 arranged in the stack 16 onto the plurality of exit rails 24, thereby permitting the plurality of workpieces 15 arranged in the stack 16 to slide or otherwise move to a packing operation or another operation. The desired quantity of the workpieces 15 in the stack 16 is calibratable, and may be a quantity of 3, 4, 5, 6, 7, 8, etc., workpieces.

Subsequently, the first controller 25 controls the linear positions of the first and second moveable members 32, 42 of the first and second linear actuators 30, 40 to reset the positions of the first and second nesting blocks 34, 44 to their initial positions in order to begin the stacking process again. In one embodiment, the first and second linear actuators 30, 40 are configured as programmable pneumatically-actuated devices. Alternatively, the first and second linear actuators 30, 40 are configured as programmable electromagnetically-actuated devices. Alternatively, the first and second linear actuators 30, 40 are configured as programmable electrically-actuated devices. Alternatively, the first and second linear actuators 30, 40 are configured as programmable mechanical screw-actuated devices.

Figure 2:
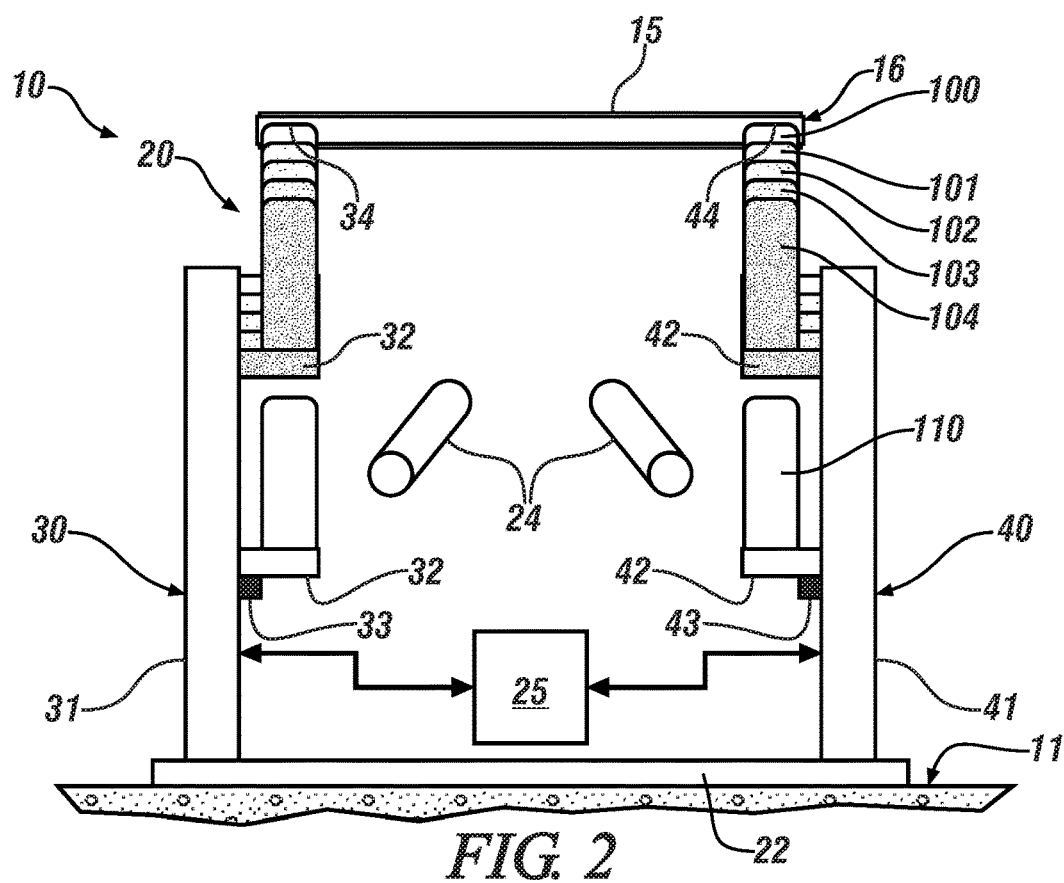
FIG. 2 schematically shows an end view of one embodiment of a workpiece accumulator system for a stamping machine, and depicts aspects thereof, in accordance with the disclosure.

FIG. 2 schematically illustrates the embodiment of the workpiece accumulator system 20 that is illustrated with reference to FIG. 1. The workpiece accumulator system 20 is arranged to accumulate and stack each of a plurality of workpieces 15 that have been fabricated by the progressive die stamping machine 10 by incrementally controlling the linear positions of the first and second moveable members 32, 42 of the first and second linear actuators 30, 40 to adjust the linear positions of the first and second nesting blocks 34, 44 to accommodate placement of the plurality of workpieces 15 into a stack 16.

As shown, the linear positions of the first and second nesting blocks 34, 44 include initial linear positions 100, a first retracted linear position 101, a second retracted linear position 102, a third retracted linear position 103, and a fourth retracted linear position 104. A fully retracted linear position 110 is also shown. The fully retracted linear position 110 is below the exit rails 24, thus permitting placement of the stack 16 of the workpieces 15 onto the exit rails 24.

Figure 3:
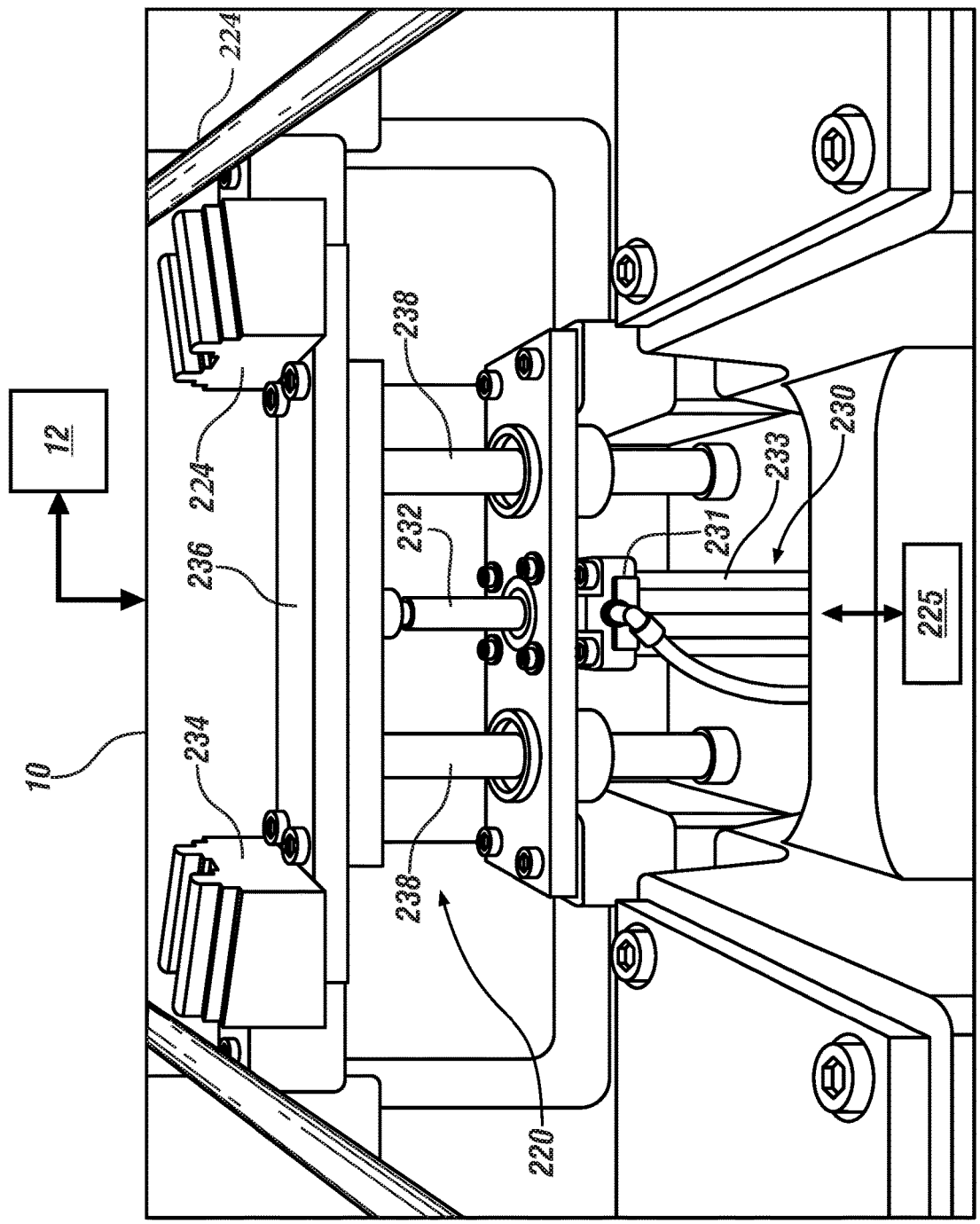
FIG. 3 schematically shows an end view of another embodiment of a workpiece accumulator system for a stamping machine, in accordance with the disclosure.

FIG. 3 schematically shows a second embodiment of the workpiece accumulator system 220 that includes a linear actuator 230, first and second nesting blocks 234, 244, respectively, a plurality of exit rails 224, and a first controller 225. The linear actuator 230 includes a static portion 231, a moveable member 232, and a position feedback sensor 233, and is controlled by the first controller 225. The linear actuator 230 is arranged with a longitudinal axis that is vertically-oriented. The first and second nesting blocks 234, 244 are disposed on an intermediary horizontal bar 236, which is disposed on the moveable member 232, and is arranged to move vertically. Guide rails 238 may be arranged in parallel with the linear actuator 230. The first and second nesting blocks 234, 244 are arranged to vertically stack a plurality of the workpieces (not shown) that have been fabricated by an embodiment of the progressive die stamping machine 10 that is described with reference to FIG. 1. The first and second nesting blocks 234, 244 are positioned in their initial positions.

The linear actuator 230 is configured as a programmable cylinder that can provide precision vertical position control of the first and second nesting blocks 234, 244 employing information from the feedback sensor 233. The linear actuator 230 is capable of linear travel in stepwise increments that are less than 1 mm in response to control commands from the first controller 225. As such, the linear actuator 230 can incrementally vertically move the first and second nesting blocks 234, 244 downward by a magnitude that may be based upon a cross-section of the workpiece (not shown), which may be between 1 mm and 10 mm in one embodiment. Thus, the first controller 225 controls the linear position of the moveable member 232 of the linear actuator 230 to incrementally adjust the linear positions of the first and second nesting blocks 234, 244 to accommodate placement of one of the plurality of workpieces in a stack. This operation may be executed when it is determined, based upon an input signal from a press controller, that the stamping machine 10 has executed a cycle advancement that is associated with fabrication of one of the plurality of workpieces. The first controller 225 controls the linear position of the moveable member 232 of the linear actuator 230 to adjust the linear positions of the respective first and second nesting blocks 234, 244 to accommodate stacking of the plurality of workpieces on the first and second nesting blocks 234, 244.

Embodiments of the workpiece accumulator system described herein operate to accurately position one or a plurality of nest blocks under workpieces, thus reducing press stoppage due to parts getting jammed. This may serve to increase the quantity of parts being stacked at end of line as compared to existing systems, and creating more efficient utilization of labor resources. This operation facilitates an increased angle of the exit rails, resulting in the stack of workpieces being able to move down the exit rails at a faster rate as compared to existing systems.

The use of embodiment of programmable cylinders such as the linear actuators in the accumulator system described herein provides accurate nest block placement on every workpiece that is cut out of the die. This will be driven by the press controller, which will re-locate the accumulator nest blocks after every stroke of the press so that the next workpiece falling onto the nest blocks will locate correctly. This results in closer nesting to the workpieces, less height required for travel units, increased angle of exit rails, and more head space to increase stack heights.

As used herein, the term "system" may refer to one of or a combination of mechanical and electrical hardware, sensors, controllers, application-specific integrated circuits (ASIC), combinatorial logic circuits, software, firmware, and/or other components that are arranged to provide the described functionality.

It should be noted that, when an element is "fixed on" or "disposed on" another element, the element may be placed on another element directly or by using an intermediate element. As used in this specification, the terms "vertical", "horizontal", "left", "right" and similar expressions are intended for description of one embodiment.

The term "controller" and related terms such as microcontroller, control module, module, control, control unit, processor and similar terms refer to one or various combinations of Application Specific Integrated Circuit(s) (ASIC), Field-Programmable Gate Array (FPGA), electronic circuit(s), central processing unit(s), e.g., microprocessor(s) and associated non-transitory memory component(s) in the form of memory and storage devices (read only, programmable read only, random access, hard drive, etc.). The non-transitory memory component is capable of storing machine readable instructions in the form of one or more software or firmware programs or routines, combinational logic circuit(s), input/output circuit(s) and devices, signal conditioning, buffer circuitry and other components, which can accessed by and executed by one or more processors to provide a described functionality. Input/output circuit(s) and devices include analog/digital converters and related devices that monitor inputs from sensors, with such inputs monitored at a preset sampling frequency or in response to a triggering event. Software, firmware, programs, instructions, control routines, code, algorithms and similar terms mean controller-executable instruction sets including calibrations and look-up tables. Each controller executes control routine(s) to provide desired functions. Routines may be executed at regular intervals, for example each 100 microseconds during ongoing operation. Alternatively, routines may be executed in response to occurrence of a triggering event. Communication between controllers, actuators and/or sensors may be accomplished using a direct wired point-to-point link, a networked communication bus link, a wireless link or another suitable communication link. Communication includes exchanging data signals in suitable form, including, for example, electrical signals via a conductive medium, electromagnetic signals via air, optical signals via optical waveguides, and the like. The data signals may include discrete, analog or digitized analog signals representing inputs from sensors, actuator commands, and communication between controllers.

The term "signal" refers to a physically discernible indicator that conveys information, and may be a suitable waveform (e.g., electrical, optical, magnetic, mechanical or electromagnetic), such as DC, AC, sinusoidal-wave, triangular-wave, square-wave, vibration, and the like, that is capable of traveling through a medium.

The terms "calibration", "calibrated", and related terms refer to a result or a process that correlates a desired parameter and one or multiple perceived or observed parameters for a device or a system. A calibration as described herein may be reduced to a storable parametric table, a plurality of executable equations or another suitable form that may be employed as an element of a measurement or control routine.

The computing system communicating with the one or more controllers may be implemented through a computer algorithm, machine executable code, non-transitory computer-readable medium, or software instructions programmed into a suitable programmable logic device(s).

The detailed description and the drawings or figures are supportive and descriptive of the present teachings, but the scope of the present teachings is defined solely by the claims. While some of the best modes and other embodiments for carrying out the present teachings have been described in detail, various alternative designs and embodiments exist for practicing the present teachings defined in the claims.

What is claimed is:

1. A workpiece accumulator system for a progressive die stamping machine, the workpiece accumulator system comprising:

a linear actuator, a plurality of nesting blocks, a plurality of exit rails, and a first controller;

wherein the linear actuator includes a static portion and a moveable member;

wherein the nesting blocks are disposed on the moveable member of the linear actuator;
wherein the nesting blocks are arranged to stack a plurality of workpieces being fabricated by the progressive die stamping machine;
wherein the first controller is operatively connected to the linear actuator to control linear position of the moveable member of the linear actuator;
wherein the first controller is configured to communicate with a second controller that is configured to control the progressive die stamping machine; and
wherein the first controller includes instructions to:
determine a cycle advancement of the progressive die stamping machine based upon an input signal from the second controller, wherein the cycle advancement is associated with fabrication of one of the plurality of workpieces,
in response to the cycle advancement, control the moveable member of the linear actuator to retract the nesting blocks from initial positions to accommodate placement of the one of the plurality of workpieces disposed in a stack on the nesting blocks, and
control the moveable member of the linear actuator to retract the nesting blocks to fully retracted positions to place the plurality of workpieces disposed in the stack on the nesting blocks onto the plurality of exit rails when a quantity of the plurality of workpieces disposed in the stack on the nesting blocks is equal to a desired quantity.

2. The workpiece accumulator system of claim 1, further comprising the first controller being operable to control the moveable member of the linear actuator to reset the nesting blocks to the initial positions subsequent to placing the plurality of workpieces disposed in the stack on the nesting blocks onto the plurality of exit rails.

3. The workpiece accumulator system of claim 2, wherein the exit rails are angled away from the workpiece accumulator system.

4. The workpiece accumulator system of claim 2, wherein the system is configured to accommodate substantially vertical transfer of workpieces from fabrication to nesting.

5. The workpiece accumulator system of claim 1, wherein the linear actuator comprises a programmable pneumatically-actuated device including the moveable member and a position feedback device.

6. The workpiece accumulator system of claim 1, wherein the linear actuator comprises a programmable magnetically-actuated device including the moveable member and a position feedback device.

7. The workpiece accumulator system of claim 1, wherein the linear actuator comprises a programmable electrically-actuated device including the moveable member and a position feedback device.

8. The workpiece accumulator system of claim 1, wherein the linear actuator comprises a programmable mechanical screw-actuated device including the moveable member and a position feedback device.

9. The workpiece accumulator system of claim 1, wherein the controller operative to control the moveable member of the linear actuator to retract the nesting blocks from the initial positions to accommodate placement of the one of the plurality of workpieces in a stack on the nesting blocks comprises the controller operative to retract the moveable member of the linear actuator by a magnitude equivalent to a cross-section of one of the plurality of workpieces.

10. A workpiece accumulator system for a progressive die stamping machine, the workpiece accumulator system comprising:
a plurality of linear actuators, a corresponding plurality of nesting blocks, a plurality of exit rails, and a first controller;
wherein each of the linear actuators includes a static portion and a moveable member;
wherein the nesting blocks are disposed on the moveable members of the linear actuators;
wherein the nesting blocks are arranged to stack a plurality of workpieces being fabricated by the progressive die stamping machine;
wherein the first controller is operatively connected to the linear actuators to control linear positions of the moveable members of the linear actuators;
wherein the first controller is configured to communicate with a second controller that is configured to control the progressive die stamping machine; and
wherein the first controller includes instructions to:
determine a cycle advancement of the progressive die stamping machine based upon an input signal from the second controller, wherein the cycle advancement is associated with fabrication of one of the plurality of workpieces, and
in response to the cycle advancement, control the moveable members of the linear actuators to retract the nesting blocks from initial positions to accommodate placement of the one of the plurality of workpieces in a stack on the nesting blocks.

11. The workpiece accumulator system of claim 10, further comprising the first controller being operable to control the moveable members of the linear actuators to retract the nesting blocks to fully retracted positions to place the plurality of workpieces in the stack on the nesting blocks onto the plurality of exit rails when a quantity of the plurality of workpieces in the stack on the nesting blocks is equal to a desired quantity.

12. The workpiece accumulator system of claim 10, wherein each of the linear actuators comprises a programmable pneumatically-actuated device including the moveable member and a position feedback device.

13. The workpiece accumulator system of claim 10, wherein each of the plurality of linear actuators comprises a programmable magnetically-actuated device including the moveable member and a position feedback device.

14. The workpiece accumulator system of claim 10, wherein each of the plurality of linear actuators comprises a programmable electrically-actuated device including the moveable member and a position feedback device.

15. The workpiece accumulator system of claim 10, wherein each of the plurality of linear actuators comprises a programmable mechanical screw-actuated device including the moveable member and a position feedback device.

16. The workpiece accumulator system of claim 10, wherein the controller operative to control the moveable members of the linear actuators to adjust the nesting blocks to accommodate placement of the one of the plurality of workpieces in a stack on the nesting blocks comprises the controller operative to retract the moveable members of the linear actuators by a magnitude equivalent to a cross-section of one of the plurality of workpieces.

17. A workpiece accumulator system for a progressive die stamping machine, the workpiece accumulator system comprising:

a plurality of linear actuators, a corresponding plurality of nesting blocks, a plurality of exit rails, and a first controller;

wherein each of the linear actuators includes a static portion and a moveable member;

wherein the nesting blocks are disposed on the moveable members of the linear actuators;

wherein the nesting blocks are arranged to stack a plurality of workpieces being fabricated by the progressive die stamping machine;

wherein the first controller is operatively connected to the linear actuators to control linear positions of the moveable members of the linear actuators;

wherein the first controller is configured to communicate with a second controller that is configured to control the progressive die stamping machine; and wherein the first controller includes instructions to:
determine a cycle advancement of the progressive die stamping machine based upon an input signal from the second controller, wherein the cycle advancement is associated with fabrication of one of the plurality of workpieces, in response to the cycle advancement, control the moveable members of the linear actuators to retract the nesting blocks from initial positions to accommodate placement of the one of the plurality of workpieces in a stack on the nesting blocks, and control the moveable members of the linear actuators to retract the nesting blocks to fully retracted positions to place the plurality of workpieces in the stack on the nesting blocks onto the plurality of exit rails when a quantity of the plurality of workpieces in the stack on the nesting blocks is equal to a desired quantity.

18. The workpiece accumulator system of claim 17, wherein each of the linear actuators comprises a programmable pneumatically-actuated device including the moveable member and a position feedback device.

19. The workpiece accumulator system of claim 17, wherein each of the plurality of linear actuators comprises a programmable electrically-actuated device including the moveable member and a position feedback device.

20. The workpiece accumulator system of claim 17, wherein the controller operative to control the moveable members of the linear actuators to adjust the nesting blocks to accommodate placement of the one of the plurality of workpieces in a stack on the nesting blocks comprises the controller operative to retract the moveable members of the linear actuators by a magnitude equivalent to a cross-section of one of the plurality of workpieces.

\* \* \* \* \*